(No Model.)
A. HORNUNG & A. H. FUOS.
TREE PROTECTOR.
No. 254,135. Patented Feb. 28, 1882.
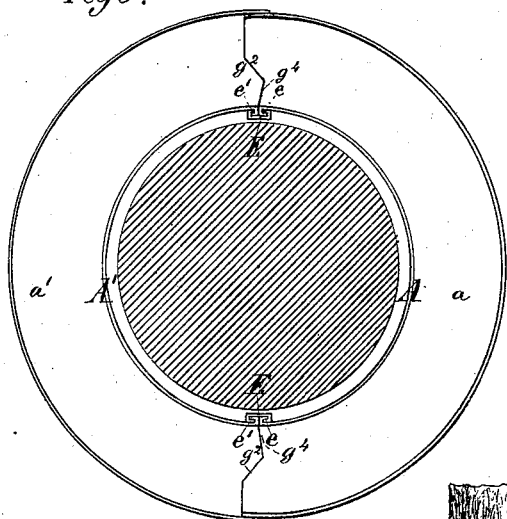
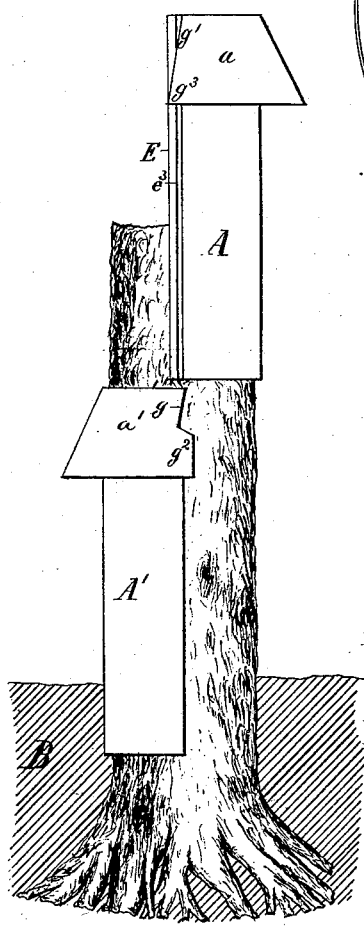
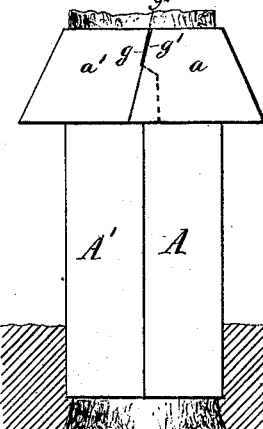
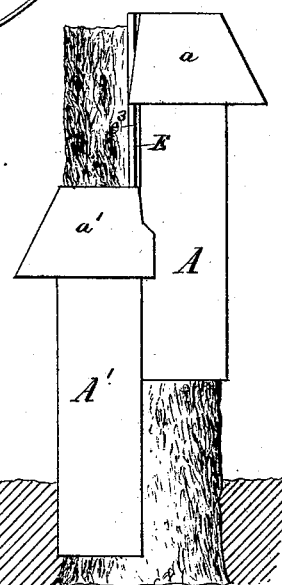
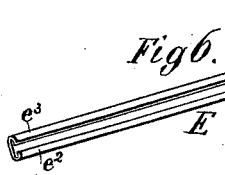
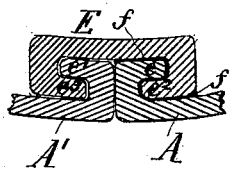
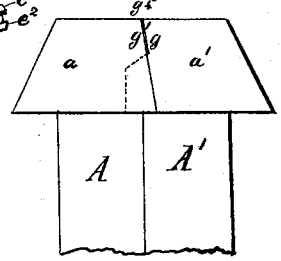
Witnesses:
J. P. Theo. Lang.
Roth L. Fenwick.
Inventor:
August Hornung
Adolph H. Fuos
by their att'ys
Mann, Fenwick & Lawrence.

UNITED STATES PATENT OFFICE.

AUGUST HORNUNG AND ADOLPH H. FUOS, OF CASTROVILLE, TEXAS.

TREE-PROTECTOR.

SPECIFICATION forming part of Letters Patent No. 254,135, dated February 28, 1882.

Application filed December 31, 1881. (No model.)

*To all whom it may concern:*

Be it known that we, AUGUST HORNUNG and ADOLPH HERRMAN FUOS, citizens of the United States, residing at Castroville, in the county of Medina and State of Texas, have invented a new and useful Tree-Protector; and we do hereby declare that the following is a full, clear, and exact description thereof, reference being had to the annexed drawings and letters of reference marked thereon, constituting a part of this specification, like letters in the several figures indicating the same parts.

In the drawings, Figure 1 is a view in elevation, showing our improved tree-protector in the act of being applied around a tree. Fig. 2 is a like view, showing the two sections of the protector partially joined together around a tree to be protected thereby. Fig. 3 is a like view as seen from the front, with the two sections of the protector completely joined or locked together and completely in place around a tree. Fig. 4 is a view in elevation of a portion of the protector, showing the rear lapping portions of its two sections as they appear when turned round in front. Fig. 5 is an inverted plan view of the tree-protector, and shows a portion of a tree inclosed thereby represented in section. Fig. 6 is a perspective view of a metal slide employed to effect the locking together of the two sections. Fig. 7 is an enlarged sectional view of the slide applied permanently to one of the sections of the tree-protector and removably connected with a fellow section.

The object of our invention is to provide the means whereby fruit-trees, ornamental trees, and other trees may be protected against the ravages of the cutting-ant and other crawling insects.

A and A' indicate half-cylinders of sheet metal, provided at their top with an inverted half-cone, $a\ a'$, as shown, the upper edges of the half-cones being joined tightly to the upper edges of the half-cylinders, and with the base of the half-cones projecting outwardly and downwardly from the half-cylinders, to which they are attached, so as to form an inner acute angle at the point of junction of the half-cones with the half-cylinders. The half-cylinders A and A' each have their longitudinal edges throughout their length turned inwardly, as indicated at $e\ e'$, Figs. 5 and 7, while to the turned or bent portions $e$ of the half-cylinder section A locking-slides E, constructed in the form shown in Fig. 6, have their turned or locking lips $e^2$ joined and soldered, as indicated in solid line $f$ in Fig. 7. Thus constructed, when the two sections A and A' are in the act of being made to inclose a portion of the body of a tree, as indicated in Figs. 1 and 2, the bent lips $e^3$ of the slides E, applied upon the longitudinal edges of the section A, will engage with the bent portions $e'$ of the section A', as clearly indicated in Figs. 5 and 7, and thereby firmly lock the two sections—a half-cylinder A and A'—together when they have been made to assume their relative position shown in Fig. 3, with their ends forced into the earth B.

In order to make a tight joint at the adjoining portions of the half-cones $a$ and $a'$ when brought into juxtaposition, as shown in Fig. 3, a portion of the half-cone $a'$ is cut away, as in Fig. 1, thus leaving an oblique edge, $g$, which will register, as at $g^4$, with the upper portion of a corresponding oblique edge, $g'$, of half-cone $a$ when the parts $g$ and $g'$ are brought into position, as shown in Fig. 3, while at the same time a portion, $g^2$, of the half-cone $a'$ (see Fig. 1) will be overlapped by a portion, $g^3$, of the half-cone $a$ when the several parts are brought into juxtaposition, as shown in Fig. 3, said portion $g^2$ acting as a stop to the further descent of the half-cylinder A when it has been thrust down to its position shown in Fig. 3, and thus at the same time forming a close joint between the adjoining parts, so that no insects can crawl between the joints thus made.

While applying the tree-protector around a tree the lower ends of the sections A and A' are thrust a short distance—say two or three inches—into the ground, and any insects crawling up the surface of the protector from the ground will find their ascent arrested in the angle formed at the junction of the half-cones with the half cylinders, and if they attempt to travel down the interior outwardly-sloping surfaces of said half-cones will from the lower edge thereof drop to the ground.

The employment of the slide E, it will be seen, not only serves as a means for effecting the interlocking of the two sections A A', but allows the exterior surfaces of the two sections to assume and maintain a uniform cylindric appearance when brought together, while the slide itself is unseen, being upon the inside of said sections.

What we claim as our invention, and desire to secure by Letters Patent, is—

1. A tree-protector composed of two half-cylinders, A and A', and two half-cones, $a$ $a'$, and with means whereby said half-cylinders and cones can be interlocked together by a sliding joint, substantially as and for the purpose described.

2. In a tree-protector, the half-cylinder A', provided with a half-cone, $a'$, cut away so as to form an oblique edge, $g$, and an extended portion, $g^2$, in combination with a half-cylinder, A, provided with a half-cone, $a$, substantially as and for the purpose described.

AUGUST HORNUNG.
ADOLPH HERRMAN FUOS.

Witnesses:
J. B. WERNETTE,
C. PINGENOT.